United States Patent [19]

Miller et al.

[11] 4,356,006

[45] Oct. 26, 1982

[54] OIL SUPPLY SYSTEM, AND METHOD OF RETROFITTING, AND METHOD OF INHIBITING OIL FOAMING IN, AN OIL SUPPLY SYSTEM

[75] Inventors: Kenneth Y. Miller, Salisbury; William R. Hutchinson, Winston-Salem, both of N.C.

[73] Assignee: Ingersoll-Rand Company, Woodcliff Lake, N.J.

[21] Appl. No.: 164,609

[22] Filed: Jun. 30, 1980

[51] Int. Cl.³ .................... B01D 19/02; F04B 49/02
[52] U.S. Cl. ................................... 55/55; 415/175
[58] Field of Search ................ 137/116; 55/55, 314, 55/338, 424; 417/295, 302, 283, 306, 307, 308; 415/175, 176, 168

[56] References Cited

U.S. PATENT DOCUMENTS

| | | | |
|---|---|---|---|
| 2,602,583 | 7/1952 | Haeberlein | 415/175 |
| 3,195,858 | 7/1965 | Schwarz | 415/175 |
| 3,395,856 | 8/1968 | Clark | 417/295 X |
| 3,448,916 | 6/1969 | Fraser | 417/295 X |

FOREIGN PATENT DOCUMENTS 197707  4/1977  U.S.S.R. ......................... 415/175

Primary Examiner—Frank A. Spear, Jr.
Attorney, Agent, or Firm—B. J. Murphy

[57] ABSTRACT

The system comprises a conventional oil/gas separator, with an oil supply line extending from the separator oil reservoir for conducting oil to a machine (such as an associated gas compressor, or the like), and a gas/oil vapor line communicating with the gas chamber of the separator, for conducting oil vapor-laden gas thereto (from such a compressor, or like machine). In an embodiment of the improvement, a check valve is interposed between the oil supply line and the reservoir to prevent oil flow from the line to the reservoir, and a by-pass line, having a pilot-pressure-closed, normally-open valve interposed therein, is coupled between the oil supply line and the gas chamber. The valve senses chamber pressure and, when the latter is sufficiently diminished, opens the by-pass line to evacuate the oil supply line (and oil cooler and filter) into the separator.

The improvement dramatically inhibits oil foaming and, among other benefits, this makes possible the use of a relatively small and, hence, inexpensive separator. The methods define the steps to be performed in modifying a conventional oil supply system (a) to incorporate the improvement therein, and (b) to control oil flow on shutdown to inhibit oil foaming.

9 Claims, 1 Drawing Figure

(INDICATES TEMPERATURE ACTUATED)

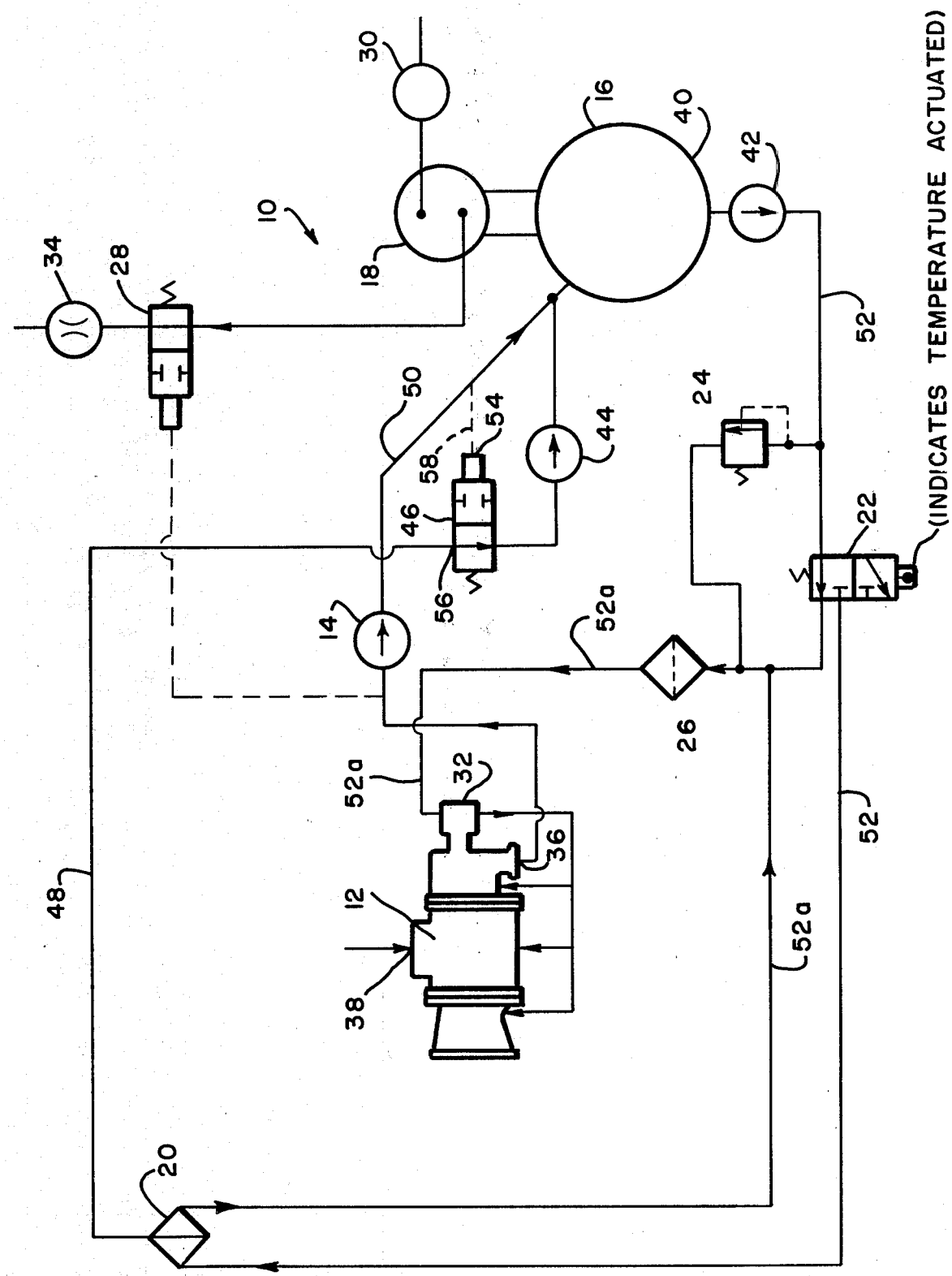

OIL SUPPLY SYSTEM, AND METHOD OF RETROFITTING, AND METHOD OF INHIBITING OIL FOAMING IN, AN OIL SUPPLY SYSTEM

This invention pertains to oil supply systems, for gas compressors or the like, and methods of retrofitting such systems, and particularly to improved systems, and methods of retrofitting conventional systems to effect an improvement thereof, which inhibit the foaming of oil upon system shutdown.

A typical "package" comprising a machine, and an oil supply system therefor requires a larger-volume air/oil separator than the quantity of oil (or air/gas), involved in the system, ordinarily would warrant. The excess volume or capacity has had to have been provided due to a heretofore unavoidable oil foaming. Now, a significant portion of the cost of, for example, a large high-pressure oil-flooded screw type air compressor and oil supply system package is the air receiver/oil separation vessel. This is due to the vessel volume required, as noted, to achieve acceptable air separation from the oil upon blowdown, (when the receiver is exhausted to atmosphere after shutdown), in view of expansive oil-foaming.

It is an object of this invention to set forth an improved oil supply system which accommodates a relatively small and, hence, inexpensive separator. It is also an object of this invention to teach a method of retro-fitting an oil supply system to incorporate therein the improvement of the aforesaid system.

It is particularly an object of this invention to set forth an improved oil supply system, having first means comprising a separator which defines (1) an oil reservoir and (2) a gas chamber thereabove; second means comprising an oil supply line communicating at one end thereof with said reservoir for supplying oil therefrom, to an oil-using machine, via the other end thereof; and third means comprising a gas/oil-vapor conduit communicating at one end thereof with said chamber for conducting gas and oil vapor to said chamber from the other end of said conduit wherein the improvement comprises control means coupled to one of said first and second means for prohibiting oil flow from said oil supply line to said reservoir; and by-pass means coupled to an intermediate portion of said oil supply line and said gas chamber, and responsive to a prescribed gas pressure subsisting in said chamber, for effecting a fluid-flow communication between said intermediate portion of said oil supply line and said gas chamber.

It is further an object of this invention to disclose a method of retrofitting an oil supply system having first means comprising a separator which defines (1) an oil reservoir and (2) a gas chamber thereabove; second means comprising an oil supply line communicating at one end thereof with said reservoir for supplying oil therefrom, to an oil-using machine, via the other end thereof; and third means comprising a gas/oil-vapor conduit communicating at one end thereof with said chamber for conducting gas and oil vapor to said chamber from the other end of said conduit; comprising the steps of coupling, to one of said first and second means, a control device for prohibiting oil flow from said oil supply line to said reservoir; coupling a by-pass, fluid conduit between an intermediate portion of said oil supply line and said gas chamber; interposing a normally-open, pilot-pressure-closed, fluid valve, having a pilot-pressure-responsive actuator for opening said valve, in said conduit; and communicating said valve actuator with said gas chamber.

It is also an object of this invention to teach a method of inhibiting oil foaming, in an oil supply system having first means comprising a separator which defines (1) an oil reservoir and (2) a gas chamber thereabove; second means comprising an oil supply line communicating at one end thereof with said reservoir for supplying oil therefrom, to an oil-using machine, via the other end thereof; and third means comprising a gas/oil-vapor conduit communicating at one and thereof with said chamber for conducting gas and oil vapor to said chamber from the other end of said conduit; comprising the steps of prohibiting oil flow from said oil supply line to said reservoir; providing a fluid by-pass conduit between an intermediate portion of said oil supply line and said gas chamber; evacuating said gas chamber of superatmospheric-pressured gas; and opening said conduit to fluid flow therethrough only when said gas chamber has been substantially evacuated of said pressured gas.

Further objects of this invention, as well as the novel features thereof, will become more apparent by reference to the following description taken in conjunction with the accompanying FIGURE which is a schematic diagram of a screw-compressor and oil supply system package which incorporates the novel improvement.

As shown in the FIGURE, the package 10 comprises a compressor 12, a discharge check valve 14, an air/oil separator 16, an air reservoir 18, an oil cooler 20, a thermal oil cooler bypass valve 22, an oil cooler pressure bypass valve 24, an oil filter 26, an automatic blowdown valve 28, a service valve 30, and an oil pump 32. The automatic blowdown valve 28 may be equipped with a restrictor orifice 34 on the outlet side to optimize blowdown time or to pilot other devices.

The arrangement and operation of such a package 10 is conventional and well known by those skilled in this art. However, as the novel improvement concerns that which happens at shutdown, operations during the latter are described below.

When operation of the compressor 12 is stopped, the oil pump 32 also stops, and prevents oil from flowing into the compressor. At the same time, the discharge check valve 14 seats and prevents any pressured air in the air/oil separator 16 from flowing back to the compressor through the discharge piping. Pressure trapped between the discharge of the compressor rotors 36 and the discharge check valve 14 is quickly exhausted by leakage through the rotors to the compressor inlet 38. Loss of pilot pressure on the normally-open automatic blowdown valve 28 allows this valve to open. Resultantly, the receiver 18 and separator 16 are vented to atmosphere.

The dynamics of the package oil system during blowdown is as follows. Air bubbles, trapped in the compressor oil between the separator oil reservoir 40 and the oil pump 32 expand, as the air pressure above them is decreased, they flow in a direction reversed to normal operation, and cause foaming of the oil in the reservoir 40 as they flow up and through the oil. This foaming action can continue and eventually reach the oil separator element (therein, not shown) unless the separator 16 is large enough, having sufficient surface area, to accomodate this temporary, additional oil volume. When the separator element becomes saturated, oil carry-over will be present in the blowdown air stream, and/or in the service air, on restart.

The FIGURE shows the improved oil supply system of the invention. This system has two additional check valves 42 and 44 and a pilot-operated, oil cooler, blowdown valve 46 and by-pass line 48.

Now, during operation of the improved system at shutdown, the compressor 12 stops, and the oil pump 32 also stops, preventing oil flow into the compressor. The discharge check valve 14 seats and prevents compressed air flow to the compressor through the discharge piping 50. Any pressured air and oil trapped between the discharge of the rotors 36 and the discharge check valve 14 are exhausted to the compressor inlet 38. Loss of pilot pressure on the normally open automatic blowdown valve 28 causes it to open, relieving the receiver 18 and separator 16 air to atmosphere. The separator oil outlet check valve 42 seats as the air pressure in the receiver and separator is relieved. This traps any entrained air in the oil cooler 20, filter 26, and oil supply line 52 and 52a between this check valve 42 and the oil pump 32. This prevents the air from foaming up through the oil in the separator reservoir 40. The pilot-pressure-operated, oil cooler, blowdown valve 46, has a ratio of approximately 12:1; i.e. the valve, normally open, but pilot-pressure closed, will not open until the pressure at the pilot port 54 is one-twelfth (1/12) of the pressure at the valve inlet port 56. In that the pilot port 54 is connected to separator 16, via a pilot-pressure line 58, through the compressor discharge piping 50, the air in the cooler 20, filter 26, and oil supply line 52 and 52a is delayed from returning to the separator 16 until the latter is nearly blow down. This delay allows sufficient time for air entrained in the reservoir 40 to foam up and dissipate prior to having additional foam in the cooler, filter, etc. returned to the separator. Also, because the inlet port 56 of this valve is connected at the top of the oil cooler 20, which is the highest point in the oil supply system, there is a larger percentage of air to foam returned to the separator. Any foam returned by the oil cooler blowdown valve 46 to the separator 16 is returned via the discharge piping 50 which is well above the level of oil or foam in the reservoir 40. Because of this, any returned foam or oil drops down into the reservoir 40, and helps break up any foam existing on top of the oil therein.

The check valve 44 in series with the oil cooler blowdown valve 56 is an optical safety device to prevent possible cavitation of the oil pump 32 on start-up.

As will be evident, now, from our teaching, the invention can be incorporated in existing, non-improved oil supply systems by simple retrofitting. Working with a conventional oil supply system, it is necessary only to add thereto the check valve 42 and the normally-open, pilot-pressure-closed valve 46 with the by-pass line 48 and pilot-pressure line 58. In the FIGURE, the by-pass line 48 is shown connected to the top of the cooler 20. Well, this is the preferred arrangement. However, broadly the invention comprises tapping into the overall oil supply line 52 and 52a anywhere between the check valve 42 and the pump 32 for the purpose of evacuating the supply line, the cooler 20, and the filter 26 of air bubbles and/or oil. In its simplist aspects, our invention teaches a method of inhibiting oil foaming, in an oil supply system having first means comprising a separator which defines (1) an oil reservoir and (2) a gas chamber thereabove; second means comprising an oil supply line communicating at one end thereof with said reservoir for supplying oil therefrom, to an oil-using machine, via the other and thereof; and third means comprising a gas/oil-vapor conduit communicating at one end thereof with said chamber for conducting gas and oil vapor to said chamber from the other and of said conduit; comprising the steps of prohibiting oil flow from said oil supply line to said reservoir; providing a fluid by-pass conduit between an intermediate portion of said oil supply line and said gas chamber; evacuating said gas chamber of superatmospheric-pressured gas and; opening said conduit to fluid flow therethrough only when said gas chamber has been substantially evacuated of said pressured gas.

While we have described our invention in connection with a specific embodiment thereof, and preferred steps of practicing the corresponding methods, it is to be clearly understood that this is done only by way of example and not as a limitation to the scope of our invention as set forth in the objects thereof and in the appended claims.

We claim:

1. An improved oil supply system, for an oil-using machine, such as a gas compressor, which machine discharges pressured gas and oil vapor, said system having first means comprising a separator which defines (1) an oil reservoir and (2) a chamber thereabove in which to confine pressured gas; second means comprising an oil supply line communicating at one end thereof with said reservoir for supplying oil from said reservoir to an oil-using and pressured gas and oil vapor-discharging machine via the other end of said supply line; and third means comprising a conduit communicating at one end thereof with said chamber for conducting pressured gas and oil vapor, discharged from a machine such as aforesaid, to said chamber; said conduit having a second end, opposite said one end, defining means for receiving therein pressured gas and oil vapor from such an aforesaid machine; wherein the improvement comprises:

control means coupled to one of said first and second means for prohibiting oil flow from said oil supply line to said reservoir; and by-pass means coupled to an intermediate portion of said oil supply line and to said chamber, and responsive to a prescribed gas pressure subsisting in said chamber, for effecting a fluid-flow communication between said intermediate portion of said oil supply line and said chamber; wherein said control means is interposed between said reservoir and said oil supply line;

said by-pass means is coupled to said portion of said oil supply line intermediate said control means and said other end of said supply line; and said by-pass means comprises (1) means defining a fluid-flow passageway which communicates, at one end thereof, with said oil supply line and, at the other end thereof, with said chamber, and (2) pilot-pressure-closed, normally-open valving means, interposed in said passageway, operative, in response to said prescribed gas pressure, for opening said passageway to fluid flow therethrough.

2. An improved oil supply system, according to claim 1, wherein:

said valving means comprises a valve having a pilot-pressure-operative means for changing said valve from a normally-open to a closed disposition; and means communicating and pilot-pressure-operative means with said chamber.

3. An improved oil supply system, according to claim 1, wherein:

said valving means comprises a normally-open, pilot-pressure-closed valve having a fluid inlet port, a fluid outlet port, and a fluid pilot-pressure port; and said valve comprises means, responsive to a prescribed fluid pilot pressure addressed to said pilot-pressure port, for changing said valve from a closed disposition to an open disposition.

4. An improved oil supply system, according to claim 3, wherein:

said valve disposition-changing means comprises pilot means responsive to a pilot pressure which is distinct from a fluid pressure at one of said inlet and outlet ports for changing said valve as aforesaid.

5. An improved oil supply system, according to claim 4 wherein:

said pilot means comprises means responsive, as aforesaid, to a pilot pressure which is one-twelfth of a fluid pressure at said inlet port.

6. A method of retrofitting an oil supply system for an oil-using machine, such as a gas compressor, which machine discharges pressured gas and oil vapor, said system having first means comprising a separator which defines (1) an oil reservoir and (2) a chamber thereabove in which to confine pressured gas; second means comprising an oil supply line communicating at one end thereof with said reservoir for supplying oil from said reservoir to an oil-using and pressured gas and oil vapor-discharging machine via the other end of said supply line; and third means comprising a conduit communicating at one end thereof with said chamber for conducting pressured gas and oil vapor, discharged from a machine such as aforesaid, to said chamber; said conduit having a second end, opposite said one end, defining means for receiving therein pressured gas and oil vapor from such an aforesaid machine; comprising the steps of:

coupling, to one of said first and second means, a control device for prohibiting oil flow from said oil supply line to said reservoir;

coupling a by-pass, fluid conduit between an intermediate portion of said oil supply line and said chamber;

interposing, in said conduit, a normally-open, pilot-pressure-closed, fluid valve, having a pilot-pressure responsive actuator for closing said valve; and communicating said valve actuator with said chamber.

7. A method, according to claim 6, wherein:

said control device coupling step comprises interposing said device between said reservoir and said oil supply line; and said conduit coupling step comprises coupling said conduit to said oil supply line intermediate said device and said other end of said supply line.

8. A method of inhibiting oil foaming, in an oil supply system for an oil-using machine, such as a gas compressor, which machine discharges pressured gas and oil vapor, said system having first means comprising a separator which defines (1) an oil reservoir and (2) a chamber thereabove in which to confine pressured gas; second means comprising an oil supply line communicating at one end thereof with said reservoir for supplying oil from said reservoir to an oil-using and pressured gas and oil vapor discharging machine, via the other end of said supply line, and third means, comprising a conduit communicating at one end thereof with said chamber for conducting pressured gas and oil vapor, discharged from a machine such as aforesaid, to said chamber; said conduit having a second end, opposite said one end, defining means for receiving therein pressured gas and oil vapor from such an aforesaid machine; comprising the steps of:

prohibiting oil flow from said oil supply line to said reservoir;

providing a fluid by-pass conduit between an intermediate portion of said oil supply line and said chamber;

evacuating said chamber of superatmospheric-pressured gas; and opening said conduit to fluid flow therethrough only when said chamber has been substantially evacuated of said pressured gas.

9. An improved oil supply system, for an oil-using machine, such as a gas compressor, which machine discharges pressured gas and oil vapor, said system having first means comprising a separator which defines (1) an oil reservoir and (2) a chamber thereabove in which to confine pressured gas; second means comprising an oil supply line communicating at one end thereof with said reservoir for supplying oil from said reservoir to an oil-using and pressured gas and oil vapor-discharging machine via the other end of said supply line; a pump, in communication with said oil supply line, for supplying oil, as aforesaid, at a given pumped pressure; and third means comprising a conduit communicating at one end thereof with said chamber for conducting pressured gas and oil vapor, discharged from a machine such as aforesaid, to said chamber; said conduit having a second end, opposite said one end, defining means for receiving therein pressured gas and oil vapor from such an aforesaid machine; wherein the improvement comprises:

control means coupled to one of said first and second means for prohibiting oil flow from said oil supply line to said reservoir; and by-pass means coupled to an intermediate portion of said oil supply line and to said chamber for effecting a fluid-flow communication between said intermediate portion of said oil supply line and said chamber; wherein said by-pass means includes means (1) responsive to a given pressure differential, between said pumped pressure and said prescribed gas pressure, for opening communication between said intermediate portion and said chamber, (2) responsive to a pressure differential, between the aforesaid pumped and prescribed gas pressures, other than said given pressure differential, for closing communication between said intermediate portion and said chamber, and (3) responsive to an absence of gas pressure in said chamber for opening communication between said intermediate portion and said chamber.

* * * * *